J. WHITAKER.
CUTTING TOOL.
APPLICATION FILED DEC. 6, 1910.
1,130,649.
Patented Mar. 2, 1915.
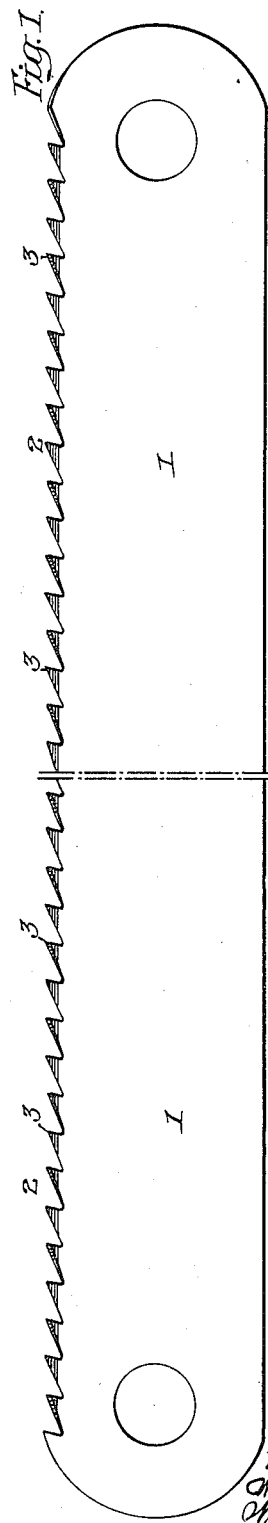
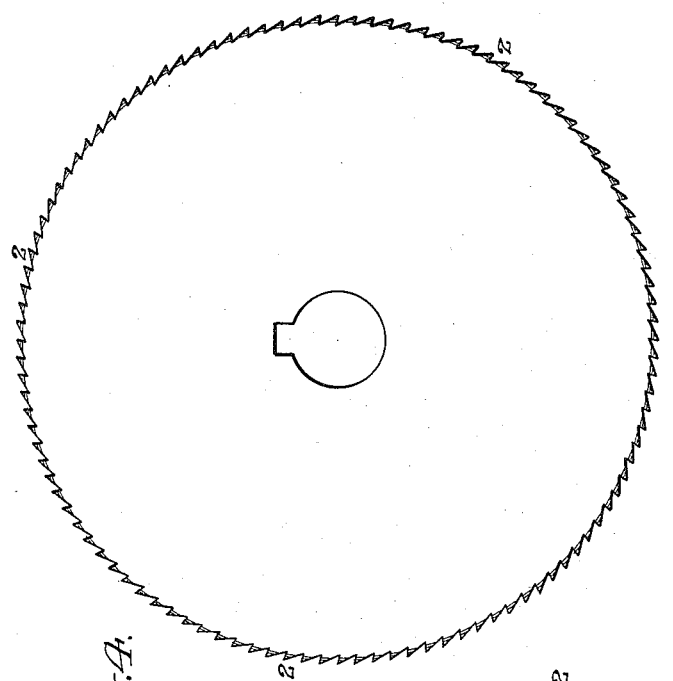
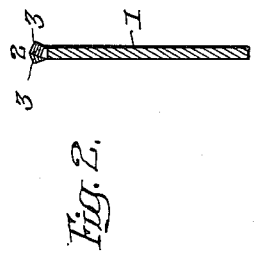
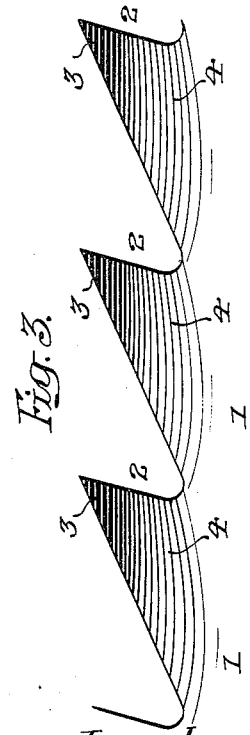
Inventor.—
John Whitaker.
by his Attorneys.—

UNITED STATES PATENT OFFICE.

JOHN WHITAKER, OF NORTH WALES, PENNSYLVANIA.

CUTTING-TOOL.

1,130,649.  Specification of Letters Patent.  Patented Mar. 2, 1915.

Application filed December 6, 1910. Serial No. 595,867.

*To all whom it may concern:*

Be it known that I, JOHN WHITAKER, a citizen of the United States, and a resident of North Wales, Montgomery county, Pennsylvania, have invented certain Improvements in Cutting-Tools, of which the following is a specification.

My invention relates to the manufacture of toothed cutting implements, that is to say, hack saws and rotary saw disks or cutting elements made of highly tempered steel; and the object of my invention is to provide saws of this type with a body or blade of a maximum degree of flexibility coupled with extremely hard teeth to form a cutting edge.

My invention is set forth more or less diagrammatically in the accompanying drawings, in which:

Figure 1, is an elevation of a hack saw blade with hardened teeth embodying my invention; Fig. 2 is a sectional view of the same showing the set of the teeth and the hardened portion thereof; Fig. 3 is an enlarged view illustrating diagrammatically the hardness and temper of the saw and tooth and the condition of the metal at or adjacent the junction of the tooth with the blade, and Fig. 4, is a view in elevation of a rotary saw or toothed cutter.

As is well known, hack saw blades are subject to very rough usage and breakage of the same is a frequent occurrence. Attempts have been made to overcome the many objections attending their use, but without valuable result. The employment of a soft back with a hard edge has not been successful nor has the use of a softer blade portion intermediate the cutting edge and the back edge, both of which are of hard temper, proven satisfactory.

The saw of my invention, on the contrary, possesses flexibility with extremely hard teeth, and may spring or bend without breaking, returning to its normal plane when the forces tending to bend it are released.

In Figs. 1, 2 and 3, of the drawings, 1 represents the blade of a hack saw and 2 the teeth of the same. In this saw, only the points of the teeth, indicated at 3, are given the high degree of hardness desirable for proper cutting purposes; the rest of the saw blade to the back of the same being spring tempered so as to be flexible. In such condition it will yield before breaking and will return to its normal plane after bending.

In preparing my improved hack saw blade I may take any ordinary commercial blade on the market, preferably one, however, made of alloy steel familiarly known as high speed steel, for instance, having a large degree of hardness, but relatively brittle, possessing but little flexibility and tempered with a view to securing as hard cutting teeth as possible, without reference to the question of flexibility; or I may prepare a blade in any usual or well known manner and harden and temper it by any suitable and efficient process or method. In either instance I draw the temper of such blade to an extent sufficient to render it spring-like, by any suitable means. The saw is then ready to receive the treatment necessary to harden the teeth of the same, which may consist of the treatment set forth in my pending application, filed August 23, 1910, Serial No. 578,564.

The important points in the preparation of my improved saw blade are: first, the hardening of the blade throughout; second, drawing the temper to the desired springy condition, and third, rehardening the point of the teeth, or as much of the tooth as may be desired. The result attained by such mode of operation is a saw having a spring tempered blade, teeth with extremely hard cutting points, and a body of tough material 4 between such points and the blade, as indicated in Fig. 3; such body preventing the teeth breaking from the spring tempered blade.

In carrying out the method or process of preparing my improved hack saw, the blade is hardened throughout; then the temper drawn to the springy condition desired, and then the points of the teeth are hardened. This action results, in practice, in the formation of a tough zone of metal between the hardened portion of the teeth (no matter what the depth of such hardening may be) and the spring tempered back or blade of the saw. This tough zone is present in all instances in saws made in accordance with my invention. The hardening of the points of the teeth may be accomplished by the formation of an electric arc at the point of the tooth as set forth in my pending application before referred to, and I have employed this method successfully in the making of saws which possess the characteristics before set forth.

By preference, the hardening of the teeth is at the points of the same as indicated by the shading in the drawings, but it will be understood that the extent or limits of this hardening may vary within the scope of my invention. For instance, it may be desirable for some purposes to harden only the extreme points of the teeth, while in other instances it may be desirable to harden the teeth almost to the roots of the same. In all instances, however, the hardening of the teeth will not affect the temper and flexibility of the rest of the blade which will possess the desired spring temper and necessary hardness compatible therewith, nor the tough portion 4 of the saw connecting the teeth and blade.

After the teeth are hardened, the temper may be drawn in them to whatever degree of hardness is best suited for the purpose to which they are to be put. This may be done by any of the usual methods, such, for instance, as immersing in sand or oil or other substance heated to the proper temperature.

While I have described my invention with reference to hack saw blades it will be understood that it is not limited thereto and that the same method of treatment to produce the desired result may be applied to band saws, and to other forms of toothed cutting instruments wherein the property of having a spring tempered flexible blade with an extremely hard cutting edge that will resist wear is desired, and in Fig. 4, I have shown a rotary toothed cutting disk having a spring tempered flexible body, with teeth having hardened points, and a tough portion between said points and the disk.

I claim:

1. As a new article of manufacture, a toothed cutting implement comprising a flexible body or blade spring tempered throughout, having a cutting edge of hardened teeth integral therewith, and a zone of toughened metal between the points forming the teeth of said cutting edge and the blade.

2. As a new article of manufacture, a hack-saw comprising a flexible body or blade of steel spring tempered throughout, with teeth having points of a higher degree of hardness and temper than said body or blade, there being a zone of tough metal connecting the points and the blade.

3. A hack-saw comprising a cutting edge with teeth having hardened points and a body or blade integral with said teeth, and spring tempered throughout, there being a zone of tough metal connecting the points and the blade.

4. A hack saw blade having a cutting edge composed of teeth having points of a high degree of hardness and temper, and a spring tempered body integral with said teeth but less hard.

5. A hack saw having a cutting edge with teeth having points of a high degree of hardness and temper, a spring tempered body integral with said teeth but less hard, and a zone of tough metal between the hardened points of the teeth and the spring tempered body.

In testimony whereof, I have signed my name to this specification, in the presence of two subscribing witnesses.

JOHN WHITAKER.

Witnesses:
 WM. E. SHUPE,
 WM. A. BARR.